BINARY STAGE
Filed May 28, 1963
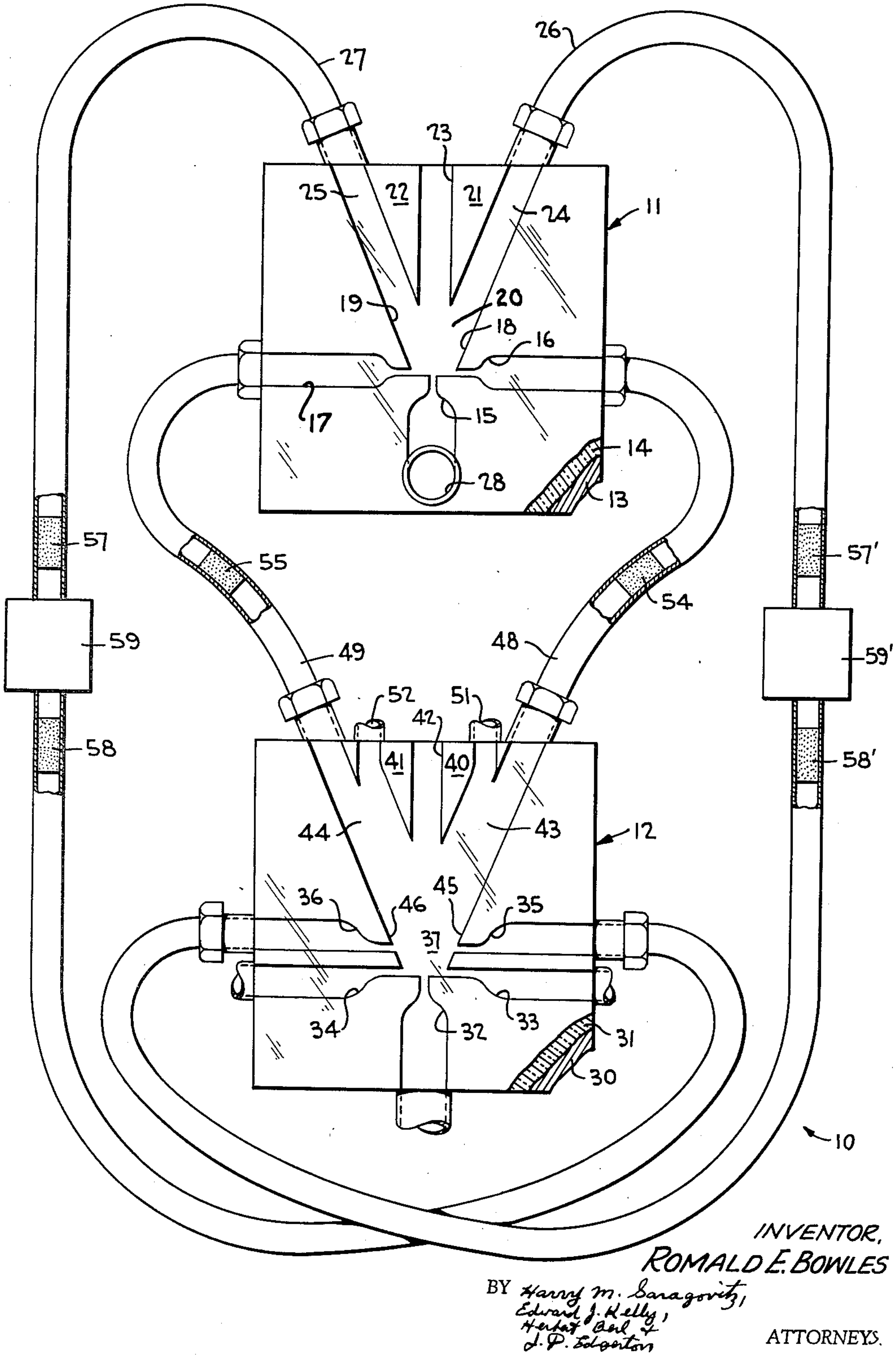
INVENTOR,
ROMALD E. BOWLES
BY Harry M. Saragovitz, Edward J. Kelly, Herbert Berl & J. P. Edgerton
ATTORNEYS.

United States Patent Office 3,223,101

Patented Dec. 14, 1965

3,223,101

BINARY STAGE

Ronald E. Bowles, Silver Spring, Md., assignor to the United States of America as represented by the Secretary of the Army Filed May 28, 1963, Ser. No. 284,296

3 Claims. (Cl. 137—81.5)

(Granted under Title 35, U.S. Code (1952), sec. 266)

The invention described herein may be manufactured and used by or for the Government for governmental purposes without the payment to me of any royalty thereon.

This invention relates generally to pure fluid systems and more particularly to a pure fluid binary stage for counting fluid input signals applied thereto without the use of any moving mechanical parts.

Electronic computers generally employ a series of binary stages for counting data bit pulses which are supplied to the computer. Such computers can, of course, speedily perform counting functions and other types of arithmetic functions as well. However, it is desirable that computing in general not be wholly limited by, and dependent upon, electronic systems and their components and power supplies. While mechanical systems employink liquid and gases have been developed which are capable of performing functions somewhat analogous to those performed by existing electronic computers, such mechanical systems require excessive numbers of moving parts and these parts produce severe operating limitations on the mechanical computer because of friction, thermal expansion and wear. In addition, in the counting operation it is essential that the response time of the computer be relatively low and yet because of the weight and inertia of the moving parts of a mechanical system, such systems are considerably slower than existing electronic systems.

Thus, there existed a need in the computing art for a system other than an electronic and other than a mechanical system incorporating moving parts for performing computing functions normally performed by such systems.

It was discovered recently that a fluid-operated system having no moving parts could be constructed so as to provide a fluid amplifier in which the proportion of the total energy of a fluid stream delivered to an output orifice or utilization device is controlled by a further fluid stream of lesser total energy. These systems are generally referred to as "pure fluid amplifiers," since no moving parts are required for their functioning.

The fluid amplifier may be one which utilizes stream-interaction, or the amplifier may utilize boundary layer control. The following description is an aid in understanding some of the control principles involved in these two categories of fluid dynamic control systems.

In a stream interaction system, a first nozzle is supplied pressurized fluid and thereby issues a first jet, the "power stream." A second jet, a "control stream," supplied by a second nozzle, is directed against the side of the first jet to impinge against and deflect the first jet away from the second jet. If there is no splash or bounce of the fluid streams, or penetration of one fluid stream by the other, momentum is conserved and the first jet will flow at an angle with respect to its original direction wherein this angle is a function of the vector sum of the momentum of the second jet and the original momentum of the first jet. Thus, it is possible to direct a high power jet to a receiving aperture system using a lower power second jet. This constitutes an amplifier in the conventional sense, since it gives a power gain. When two or more control streams are used, impinging streams of the same total pressure level can be given different weighting or levels of effectiveness by varying the relative cross-sectional areas of the first and second nozzles. This weighting can also be varied by varying the velocity, density or direction of the control streams.

In wall interaction control fluid amplifiers, a first jet is directed towards a receiving aperture system by the pressure distribution in the first-jet wall region. This pressure distribution is controlled by the wall configuration of the interaction chamber, the first-jet energy level, the fluid transport characteristics, the back-loading of the amplifier outputs, and the flow of second-jet to the first-jet wall region. Whereas sidewalls are not essential for a stream interaction type fluid amplifier, a wall interaction control fluid amplifier generally uses sidewalls for aiding in the deflection of the first jet. In a wall interaction control fluid amplifier, special design of the interaction chamber provides an amplifier wherein the first jet will lock onto one sidewall and remain in the locked-on flow configuration without fluid flow from the second nozzle.

As the fluid stream issues from the first jet, it entrains fluid in the jet interaction chamber. As fluid is entrained and removed by the first jet, the pressure along one chamber wall reduces. The particular wall along which the reduced pressure region occurs will depend upon the position of one chamber wall relative to the orifice of the first jet. When one chamber wall is positioned slightly closer to the orifice than the other, the pressure on the side of the fluid stream closest to the one chamber wall will be lower than on the side of the stream towards the other chamber wall because of the fact that the process of removing entrained fluid is more effective with respect to the one chamber wall than with respect to the other wall. As the pressure between the fluid stream and the one chamber wall decreases, the fluid stream moves closer towards that one chamber wall, and this movement produces a still further reduction in pressure as a result of increased entraining of fluid between the wall and the stream. In digital wall interaction amplifiers, the fluid stream bends until it locks onto the one chamber wall and remains locked on until disturbed by a fluid control signal applied between the one chamber wall and the fluid stream.

The fluid amplifiers utilized in the components of the present invention control the delivery of energy of a first stream of fluid to an outlet orifice or utilization device by means of a second fluid flow issuing from a second nozzle generally at right angles to the first jet. The proportion of the relatively high energy main stream delivered to an orifice may be varied as a linear or nonlinear function of the flow or momentum of the relatively low energy stream interacting therewith. Since the energy controlled is larged than the controlling energy, an energy gain is realized. Such amplifiers require no moving parts and consequently have a response time considerably lower than prior art fluid systems which must employ moving parts.

According to the present invention, the pure fluid binary counting stage comprises a pair of pure fluid amplifiers coupled together through a delay and energy storage system such that one of the fluid amplifiers changes state each time the other fluid amplifier receives a fluid input signal. All parts comprising the pure fluid binary stage remain stationary during operation thereof, and only the fluid employed as the working fluid moves in the binary counting stage.

It is broadly therefore an object of this invention to provide a pure fluid binary counting stage.

More specifically, it is an object of this invention to provide a pure fluid binary stage that includes a pair of pure fluid amplifiers intercoupled through a delay and energy storage system such that one of the pure fluid amplifiers of the pair changes state each time the other pure fluid amplifier receives a fluid input signal.

Still another object of this invention is to provide a pure fluid binary counting stage that can be reset upon completion of a counting cycle.

The specific nature of the invention as well as other objects, uses and advantages thereof will clearly appear from the following description and from the accompanying drawing, in which the figure illustrates a plan view of a preferred form of a pure fluid binary stage constructed in accordance with this invention.

Referring now to the figure for a more complete understanding of the invention, the pure fluid binary stage is designated by the numeral 10 and comprises two pure fluid amplifiers 11 and 12. The pure fluid amplifier 11 is defined between a pair of flat plates 13 and 14, respectively, which are sealed fluid tight one to the other by adhesives, machine screws, or any other suitable means. The plates 13 and 14 may be composed of any composition compatible with the fluids employed in the binary counter and for the purpose of illustration are shown composed of a clear, plastic material. The various ducts, passages and nozzles which form the fluid amplifier 11 are formed in the plate 13 by molding, milling or other suitable techniques, and the plate 14 is thereafter sealed to the plate 13 so as to confine the flow of fluid to these ducts, passages and nozzles.

The pure fluid amplifier 11 including a power nozzle 15, and a pair of control nozzles 16 and 17 which are positioned to discharge interacting fluid streams against a power stream issuing from the power nozzle 15 into the interaction chamber 20. The sidewalls 18 and 19 of the interaction chamber 20 are disposed relative to the orifice of the power nozzle 15 such that boundary layer attachment will occur between the power stream issuing from the power nozzle 15 and the sidewall towards which the power stream is displaced by fluid issuing from the control nozzles 16 and 17. A pair of flow dividers 21 and 22 are positioned downstream of the interaction chambers 20, and form between them a passage 23 which is open to the ambient or sump pressure environment surrounding the amplifier 11. Right and left output passages 24 and 25 respectively, are formed by the extensions of the sidewalls 18 and 19, respectively, and by sidewalls of the flow dividers 21 and 22, respectively. A pair of tubes 26 and 27 are threadedly connected at the ends thereof into the downstream ends of the passages 24 and 25, respectively, to receive fluid issuing from the passages 24 and 25. The power stream is supplied to the power nozzle 15 through a tube 28.

The second pure fluid amplifier 12 is, like the amplifier 11 described hereinabove, also formed between a pair of flat plates 30 and 31 which are sealed one to the other by adhesives or other suitable means. The fluid amplifier 12 includes the power nozzles 32, two pairs of opposed control nozzles 33, 34 and 35, 36 in communication with the interaction chamber 37 for effecting amplified directional displacement of the power jet issuing from the nozzle 32. Flow dividers 40 and 41 are positioned downstream of the interaction chamber 37 and define between them a passage 42 which communicates with the ambient environment of fluid amplifier 12. The output passages 43 and 44 are also located downstream of the interaction chamber 37 and are partially defined by the sidewalls 45 and 46, extended, and by opposing sidewalls of the flow splitters 40 and 41, respectively.

A pair of tubes 48 and 49 are threadedly connected at the ends thereof into the downstream ends of the output passages 43 and 44, respectively, and into the control nozzles 16 and 17, respectively of the pure fluid amplifier 11. Tubes 51 and 52 are also connected to the downstream ends of the output passages 43 and 44, respectively, and the fluid issuing from the tubes 51 and 52 correspond to the one and the zero states respectively of the fluid amplifier 12. The sidewalls 45 and 46 of the interaction chamber 37 are positioned with respect to the orifice of the power nozzle 32 such that fluid issuing from the power nozzle 32 and deflected by one of the control nozzles will lock on to the chamber sidewall 45 or 46 which is opposite the control nozzle pair 33, 35 or 34, 36 that is issuing the deflecting fluid stream. A fluid control signal from the nozzle 33, for example, will drive the pure fluid amplifier to the zero state in the absence of overriding control stream flow the opposed control nozzle 36, while fluid issuing from the control nozzle 33 can be employed to reset the pure fluid amplifier 12 back to the zero state in the absence of an overriding control stream flow from either control nozzle 34 or 36. The control nozzle 34, for example, may be used to set the amplifier 12 to the one state by supplying a fluid signal that overrides control stream flow from either or both of the opposed control nozzles 33 and 35.

The tubes 48 and 49 are provided with a pair of porous fluid resistors designated generally by the numerals 54 and 55, respectively, which serve as an impedance to fluid flow in the tubes 48 and 49, respectively. The tubes 26 and 27 extending from the outputs of the amplifier 11 are connected to the control nozzles 36 and 35, respectively, through a flow impedance and energy storage system that includes the porous fluid resistors 57 and 57′ and the porous fluid resistors 58 and 58′ positioned on both sides of fluid capacitances 59 and 59′, respectively.

While the fluid resistors 57, 57′; 58 and 58′ serve to impede or delay the flow of fluid through the tubes 26 and 27, the fluid capacitances 59 and 59″ are utilized to store fluid energy as potential energy, and thereby serve as energy storage devices that are connected between the output of the fluid amplifier 11 and the control nozzles of the fluid amplifier 12. As will be evident to those working in the art, the term "fluid capacitance" defines a class of devices capable of storing fluid energy as potential energy and may, for example, take the form of an elastically deformable chamber or a storage tank. Since, in accordance with the instant invention, it is desirable to obviate the use moving parts, a hollow fluid storage tank is preferably incorporated as the energy storage system when using a compressible fluid, the tank receiving fluid from the tubes 26 and 27 through the resistors 57′ and 57, respectively. Fluid discharging from the tanks 59 and 59′ flow through the resistors 58 and 58′, respectively, and hence into the nozzles 35 and 36, respectively.

The passages 23 and 42 formed in the amplifier 11 and 12 permit the ingress and egress of fluid to the interaction chambers 17 and 37, respectively, and thereby insure bistable operation of the power streams flowing in these interaction chambers by preventing the build-up of undesirable backloading and accompanying undesirable pressures in each interaction chamber.

In the binary counter described hereinabove, the power nozzle 15 receives the successive series of fluid input pulses which are to be counted. The power nozzle 32 of the fluid amplifier 12 is reset to the zero state by fluid supplied to the control nozzle 33 displacing the power stream issuing from the power nozzle 32 into the output passage 44 and into the tube 52. Once wall attachment is established between the power jet issuing from the power nozzle 32 and the chamber sidewall 46 the further application of a reset fluid pulse may be discontinued. Fluid also flows into the tube 49 the fluid resistor 55 impedes fluid flow through the tube 49 so that the magnitude of the fluid jet issuing from the control nozzle 17 is just sufficient to cause deflection of the first pulse type of fluid input signal that egresses from the power nozzle 15. When the first pulse jet issues from the power nozzle 15 the interaction that occurs between the control stream issuing from the control nozzle 17 and the pulse type power jet issuing from the power nozzle 15 results in the displacement of the pulse type power jet into the output passage 24 and hence into the tube 26. The fluid issuing from the output passage 24 has its flow impeded by the fluid resistors 57′ and 58′ and the energy of the combined fluid stream is stored as potential energy so that there is a time delay in the passage of fluid from the output passage 24 to the control jet 36. The capacitance 59′ can be designed by those working in the art such that the storage of the potential energy of the fluid stream in the tube 26 occurs during the interval when a pulse is supplied to the output passage 24 by the power nozzle 15, and even after the subsequent cessation of the pulse from the power nozzle 15, the capacitance 59′ will discharge the fluid stored therein, into the control nozzle 36, that control nozzle being positioned further downstream from the power nozzle 32 and from the control nozzle 33 which may be used to issue a weak biasing fluid control stream. Consequently, the fluid pulse issuing from the control nozzle 36 displaces the fluid stream issuing from the power nozzle 32 into the output into the output passage 43 until the power stream locks onto the sidewall 45, as discussed hereinabove. A portion of the combined fluid stream will then be received by each of the tubes 48 and 51, the portion of fluid issuing from the tube 51 indicating a state of "one" for the pure fluid amplifier 12.

The flow of fluid entering the tube 48 is impeded by the porous resistor 54, and the resistor 54 can be designed such that any flow issuing as a control jet from the control nozzle 16 which flows into the output passage 25 and hence into the control nozzle 35, has a magnitude lower than that required to displace the fluid issuing from the power nozzle 32 of the fluid amplifier 12, from the sidewall 45. The fluid jet issuing from the control nozzle 16 of the amplifier 11, however, possesses sufficient magnitude to bias the next successive fluid pulse supplied to the power nozzle 15 of the amplifier 11 into the output passage 25. Fluid entering the output passage 25 flows into the tube 27 and the potential energy of the fluid is stored in the capacitance 59 in the same manner as fluid entering the tube 26 from the output passage 24 is stored in capacitance 59′. The capacitance 59 continues to store some of the fluid energy supplied thereto as potential energy until termination of the second fluid pulse supplied to the power nozzle 15. The resistance 57-capacitance 59-resistance 58 system provides a time delay after which the control nozzle 35 starts to issue a fluid control stream which displaces the power stream issuing from the power nozzle 32 into the left output passage 44 from whence portions of the fluid enters the tubes 49 and 52, respectively. The fluid entering the tube 52 indicates the new state of the pure fluid amplifier 12; that is, a change from the "one" stage back to the "zero" state. The fluid entering the tube 49 has the magnitude thereof decreased as a result of having to pass through the porous resistor 55 before issuing as a control stream from the control nozzles 17 with a magnitude that is too low to cause a displacing control jet to issue from the control nozzle 36 of the pure fluid amplifier 12, but possesses a large enough magnitude to effect displacement of the third successive pulse issuing from the power nozzle 15 into the right output passage 24.

As will be apparent from the foregoing description the amplifier 12 changes state in a bistable manner as each successive input pulse is supplied to the power nozzle 15 of the amplifier 11. The output fluid signals from the tubes 51 or 52 of the pure fluid amplifier 12 may be connected to the power nozzle of a successive stage similar to the amplifier 11 to cause a change from the zero to the one state and then back to the zero state as successive pulses are received, may be connected to control nozzles of other pure fluid devices such as for example the pure fluid amplifier disclosed in U.S. Patents Nos. 3,001,698; 3,016,063; and 3,024,805. The number of binary stages connected in tandem will of course be primarily dependent upon the total count anticipated and each binary stage can be appropriately biased by inclining the power nozzle more towards one output passage than the other or by otherwise designing the pure fluid amplifier in accordance with techniques known to those in the art. At the end of any count the flow pattern in the various binary stages employed in the counter will indicate the total number of fluid input pulses supplied to the input tube 28. At the end of a particular counting sequence the binary stage 10 and all successive stages connected thereto can be reset by applying a fluid signal to the reset nozzle 33. In a similar fashion control nozzles 33 and 34 can be used to preset a desired count into the counter system.

While I have described and illustrated one specific embodiment of my invention, it will be clear that variations of the details of construction which are specifically illustrated and described may be resorted to without departing from the true spirit and scope of the invention as defined in the appended claims.

I claim:

1. A pure fluid binary stage for counting fluid pulses comprising:

(a) first and second bistable fluid amplifiers;

(b) each of said amplifiers having a power nozzle for issuing a power stream into an interaction chamber, first and second output passages downstream of said chamber, and first and second control nozzles for issuing control streams into said chamber to effect displacement of said power stream into said first and second output passages, respectively;

(c) said power nozzle of said first amplifier being connected to a source of fluid power;

(d) said power nozzle of said second amplifier being connected to a source of said fluid pulses to be counted;

(e) conduit means connecting said first and second output passages of said first amplifier to said second and first control nozzles, respectively, of said second amplifier;

(f) conduit means connecting said first and second output passages of said second amplifier to said first and second control nozzles, respectively, of said first amplifier;

(g) biasing means maintaining said power stream of said first amplifier in one of said output passages thereof in the absence of a fluid pulse being presented to said power nozzle of said second amplifier; and (h) said power stream of said first amplifier being displaced into the other of said output passages thereof in response to a fluid pulse being presented to said power nozzle of said second amplifier; whereby (i) the state of said first amplifier changes each time said second amplifier receives a fluid pulse.

2. The binary stage according to claim 1, wherein:

(a) said amplifiers are of the wall attachment type;

(b) said conduit means connecting said output passages of said first amplifier to said controls of said second amplifier includes fluid resistance means therein for impeding the flow of fluid therethrough;

(c) said conduit means connecting said output passages of said second amplifier to said controls of said first amplifier includes fluid resistance and capacitance means therein for delaying the flow of fluid therethrough;

(d) said biasing means includes a pair of oppositely disposed control nozzles upstream of said first and second control nozzles for issuing biasing control streams; and (e) said pair of control nozzles also providing means for issuing control streams to change the state of said first amplifier.

3. The binary stage according to claim 2, wherein:

(a) said first amplifier includes output signal producing means connected to said first and second output passages thereof for indicating the binary "0" and the binary "1" states of said first amplifier; and (b) said amplifiers have passage means downstream of said power nozzles for maintaining said chambers at the ambient pressure environment surrounding said amplifiers.

References Cited by the Examiner

UNITED STATES PATENTS

| | | | |
|---|---|---|---|
| 3,024,805 | 3/1962 | Horton | 137—597 |
| 3,075,548 | 1/1963 | Horton | 137—569 |
| 3,158,166 | 11/1964 | Warren | 137—81.5 |

FOREIGN PATENTS

| | | |
|---|---|---|
| 1,278,781 | 11/1961 | France. |

M. CARY NELSON, *Primary Examiner.*

LAVERNE D. GEIGER, *Examiner.*